United States Patent [19]

Starzewski et al.

[11] Patent Number: 4,849,488
[45] Date of Patent: Jul. 18, 1989

[54] POLYMERIZATION OF ACRYLIC DERIVATIVES

[75] Inventors: Karl H. A. O. Starzewski, Bad Vilbel; Josef Witte, Koeln 80, both of Fed. Rep. of Germany

[73] Assignee: Bayer Aktiengesellschaft, Leverkusen, Fed. Rep. of Germany

[21] Appl. No.: 95,386

[22] Filed: Sep. 10, 1987

[30] Foreign Application Priority Data

Sep. 24, 1986 [DE] Fed. Rep. of Germany ....... 3632361
Jan. 6, 1987 [DE] Fed. Rep. of Germany ....... 3700195

[51] Int. Cl.$^4$ .......................... C08F 2/00; C08F 20/10
[52] U.S. Cl. ...................................... 526/193; 526/328
[58] Field of Search ................................ 526/193, 328

[56] References Cited

U.S. PATENT DOCUMENTS

| | | |
|---|---|---|
| 2,520,601 | 8/1950 | Lee ....................... 526/193 |
| 3,767,547 | 10/1973 | Puhk ....................... 526/193 |
| 4,046,636 | 9/1977 | Ullman et al. . |
| 4,048,415 | 9/1977 | Matsuzawa et al. ................. 526/128 |
| 4,214,048 | 7/1980 | Kitagawa . |
| 4,253,844 | 3/1981 | Linet ..................... 436/532 |
| 4,253,996 | 3/1981 | Katz . |
| 4,323,647 | 4/1982 | Monji et al. . |
| 4,334,069 | 6/1982 | Buckler et al. . |
| 4,487,715 | 12/1984 | Nitecki et al. . |
| 4,517,303 | 5/1985 | Freytag ................. 436/827 |
| 4,717,783 | 1/1988 | Dabas et al. ........... 585/511 |

FOREIGN PATENT DOCUMENTS

| | | | |
|---|---|---|---|
| 3815086 | 8/1963 | Japan ..................... 526/193 |
| 3914802 | 7/1964 | Japan ..................... 526/193 |
| 42-3194 | 2/1967 | Japan ..................... 526/193 |
| 56-115304 | 9/1981 | Japan ..................... 526/193 |
| 60-190405 | 9/1985 | Japan ..................... 526/193 |
| 60-233113 | 11/1985 | Japan ..................... 526/193 |
| 0707909 | 1/1980 | U.S.S.R. .................. 560/12 |
| 568709 | 4/1945 | United Kingdom ........ 526/193 |
| 1184360 | 3/1970 | United Kingdom ........ 526/193 |

OTHER PUBLICATIONS

Kitagawa et al., (1976) J. Biochem. 79:233-236.
Yoshitake et al., (1979) Eur. J. Biochem. 101: 395-399.
Reactor et al., (1978) J. Immunol. Methods 24: 321-336.
Carlsson et al., (1978) Biochem. J. 173:723-737.
Pain et al., (1981) J. Immunol. Methods 40:219-230.
Klausner et al., in *Peptides, Proceedings of the Fifth American Peptide Symposium*, ed. by M. Goodman et al., (New York: John Wiley and Sons, 1977), pp. 536-538.
Gershkovich et al., (1978) Bioorganicheskaya Khimiya 4:1129-1131.
Gershkovich et al., (1979) Bioorganicheskaya Khimiya 5:1125-1132.
Gershkovich et al., (1982) Bioorganicheskaya Khimiya 8:1486-1489.
Bhatnagar et al., in *Peptides: Synthesis–Structure Function*, ed. by D. Rich et al., (Rockford: Pierce Chemical Company, 1981) pp. 97-100.
Nitecki et al., in *High Technology Route to Virus Vaccines* (ed. by Dreesman et al., 1985) pp. 43-45.
Bodanszky J. Ong. Chem. 38(7) pp. 1296-1300 (1973).

Primary Examiner—Joseph L. Schofer
Assistant Examiner—N. Sarofim
Attorney, Agent, or Firm—Sprung, Horn, Kramer & Woods

[57] ABSTRACT

Acrylic derivatives are polymerized thermally in the presence of compounds which have or contain the following structure

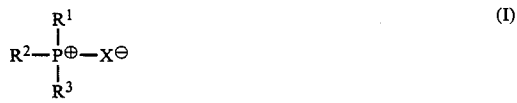

12 Claims, No Drawings

POLYMERIZATION OF ACRYLIC DERIVATIVES

The invention relates to a process for the polymerization of acrylic derivatives in the presence of certain phosphorus compounds as polymerization catalysts.

It is known, from "Makromolekulare Chemie" 153 (1972), 289 to 306, that phosphorus ylides are able to initiate anionic polymerization of vinyl monomers, salt-free ylides of the formula $R_3P=CH-X$ and salt-containing ylides of the formula $R_3P=CH_2 \cdot LiBr$ being suitable. At $-60°$ C., the initiating activity of the salt-free ylides can only be detected in the case of acrylonitrile and methacrylonitrile. It is known, from Journal of Polymer Science, "Polymer Letters Edition" 21 (1983) page 217-222, that a specific triphenylphosphonium ylide can be used for photopolymerization of methyl methacrylate (MMA). According to this publication, however, the triphenylphosphonium ethoxycarbonylmethylide used does not initiate the polymerization of methyl methacrylate under thermal conditions (60° C.). EP-A-145,263 and EP-A-121,439 disclose further polymerization processes for acrylic derivatives. A review on stereospecific polymerization of α-substituted acrylates can be found in "Advances in Polymer Science" 31 (1979).

The use of ylides in nickel-catalysed polymerization of ethylene and acetylene has already been disclosed, for example, by DE-A-3,336,500 and 3,403,493. Polymerization-active ketenesilyl acetals as products of the reaction of phosphites with α,β-unsaturated esters are already known from Polymer Preprints, ACS Div. Polym. Chem. (1986) 27, 165-166. In this case, however, only very specific phosphonates are obtained.

The invention relates to a process for thermal polymerization of acrylic derivatives in the presence of a catalyst, characterized in that the catalyst corresponds to or contains the following structure

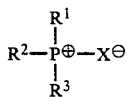   (I)

in which

R$^1$, R$^2$ and R$^3$, independently of one another, denote conventional substituents for organophosphorus compounds, specifically for P-ylides, in particular straight-chain or branched C$_1$-C$_{20}$-alkyl radicals, C$_6$-C$_{12}$-aryl radicals, C$_2$-C$_{30}$-alkenyl radicals, C$_3$-C$_8$-cycloalkyl radicals, C$_6$-C$_{12}$-aryl-C$_1$-C$_{20}$-alkyl radicals, C$_1$-C$_{20}$-alkyl-C$_6$-C$_{12}$-aryl radicals, halogen, hydroxyl, C$_1$-C$_{20}$-alkoxy radicals, C$_6$-C$_{12}$-aryloxy radicals, C$_1$-C$_{20}$-alkylamino, C$_6$-C$_{12}$-arylamino, C$_1$-C$_{20}$-alkylphosphino, C$_6$-C$_{12}$-arylphosphino, and the above hydrocarbon radicals substituted, in particular, by cyano, sulphonate, silyl, stannyl, halogen, hydroxyl, amino, C$_1$-C$_{20}$-alkylamino, C$_6$-C$_{12}$-arylamino, nitro, C$_1$-C$_{20}$-alkyl-phosphino, C$_6$-C$_{12}$-arylphosphino, C$_1$-C$_{20}$-alkoxy or C$_6$-C$_{12}$-aryloxy, an alkali metal, in particular lithium, or the —CO—R$^7$ radical, in which R$^7$ is hydrogen or has a meaning mentioned under R$^1$, and where R$^2$ can have the meaning

X denotes O, N—R$^4$,

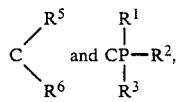

CCO, CCS,

R$^4$, R$^5$ and R$^6$, independently of one another, each denote hydrogen, a sulphonate radical, an alkali metal, in particular lithium, silyl or stannyl radicals, phosphino radicals and boranyl radicals acyl, halogen, cyano, a —CO—R$^7$ radical or a radical mentioned under R$^1$ and where at least two of the radicals R$^1$ to R$^7$, together, can be part of an isocyclic or heterocyclic ring, where, in particular, R$^5$ and R$^6$, together with the common C atom, can form a saturated or unsaturated isocyclic or heterocyclic ring, those compounds of the formula (I) which are ketenesilyl acetals obtained by addition of silyl phosphites to α,β-unsaturated esters being excepted, and the polymerization being carried out at temperatures above $-20°$ C., in particular above 20° C., in particular between 40° to 120° C.

R$^1$, R$^2$ and R$^3$, independently of one another, preferably represent phenyl or C$_1$-C$_6$-alkyl, in particular isopropyl, X preferably represents CHR$^5$, and R$^5$ preferably represents hydrogen or C$_1$-C$_6$-alkyl.

In a further preferred embodiment, preferred acyl radicals R$^4$ to R$^6$ are acetyl, formyl and benzoyl, carbomethoxy or carboethoxy.

In a further preferred embodiment, X represents CH$_2$, CH-phenyl, N-silyl and C(CN)$_2$, CH-vinyl, CH-propenyl and CH-styryl, and represents CH-acyl, in particular CH-formyl, CH-acetyl, CH-benzoyl, CH-carbomethoxy, and represents C(acetyl)$_2$ and C(benzoyl)$_2$.

The catalyst to be used according to the invention can also be a mononuclear or polynuclear main-group complex which contains a structure according to the abovementioned formula (I). A preferred complex corresponds to the following formula (II)

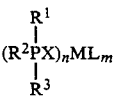   (II)

in which

R$^1$, R$^2$, R$^3$ and X have the meaning mentioned under formula (I), and in which n denotes 1 to 4

M denotes a main-group element of group 1 to 4, in particular 3 and 4,

L denotes a ligand, preferably hydrogen, halogen or an organic radical, in particular alkyl, aryl or aralkyl, where, when m>1, L can adopt meanings 1 to m m denotes 1-3.

The catalysts to be used according to the invention can, if appropriate, be electrically charged, a counterion providing the charge compensation.

M is, in particular, an element of main-group 3 or 4, above all boron, aluminium, silicon or tin. Preferred complexes of this type are
($Ph_3PCH_2.AlEt_3$),
($Ph_3PCH_2.SiMe_3$)$^+Cl^-$
($Ph_3PCHCHO.SnMe_3$)$^+Cl^-$
($Ph_3PCHMeO.SiMe_3$)$^+Cl^-$
($Ph_3PCHCPhO.BF_3$)
wherein Ph denotes a phenyl radical, Et denotes an ethyl radical and Me denotes a methyl radical.

In another preferred embodiment, the catalyst used is the product of the production of the abovementioned formula (I). Preferred protonation products are obtained, for example, by reacting a phosphine with an organyl halide or by reacting an ylide with an acid, see H. J. Bestmann and R. Zimmermann, Fortschritte d. chem. Forsch. 20 (1970).

Compounds of the abovementioned formula (I) are known, and some main-group complexes and the protonation products are likewise known or can be prepared by conventional methods (cf., for example, H. Schmidbaur, Accounts of Chemical Research 8, 62–70 (1975) and the literature cited therein). The complexes (II) can be obtained, for example, by reacting a Lewis acid with a compound of the abovementioned formula (I).

In a further preferred embodiment, at least one of the substituents of the formula (I) is a siloxy-substituted alkenyl radical.

In a further preferred embodiment, the polymerization can be carried out in the presence of a nucleophile, for example fluoride, in particular a bifluoride.

Suitable acrylic derivatives are, for example, methyl methacrylate, butyl methacrylate, sorbyl acrylate and methyl acrylate, lauryl methacrylate, ethyl acrylate, butyl acrylate, acrylonitrile, 2-ethylhexyl methacrylate, 2-(dimethylamino)ethyl methacrylate, 2-(dimethylamino)ethyl acrylate, 3,3-dimethoxypropyl acrylate, 3-methacryloxypropyl acrylate, 2-acetoxyethyl methacrylate, p-tolyl methacrylate, 2,2,3,3,4,4,4-heptafluorobutyl acrylate, ethyl 2-cyanoacrylate, 4-fluorophenyl acrylate, 2-methacryloxyethyl acrylate and ethyl 2-chloroacrylate, glycidyl methacrylate, 3-methoxypropyl methacrylate, phenyl acrylate, allyl acrylate and methacrylates, and unsaturated esters of polyols, for example ethylene glycol diacrylate, diethylene glycol diacrylate etc.

Particularly preferred acrylic derivatives are acrylates and methacrylates of monovalent and polyvalent alcohols, but preferably acrylates and methacrylates of monovalent aliphatic alcohols having 1 to 12 carbon atoms.

In a preferred embodiment, copolymers having at least two different acrylic derivatives are prepared. Particularly preferred combinations are
ethyl acrylate/butyl acrylate
methyl methacrylate/butyl acrylate
ethyl acrylate/butyl acrylate/glycidyl methacrylate In a further preferred embodiment, the process is used, in a fashion known per se, to prepare block copolymers.

The polymerization can be carried out in the solid phase or in a suitable solvent. Suitable solvents are, above all, aprotic solvents, such as benzene, toluene, xylene, ketones, such as acetone and methyl ethyl ketone, esters such as ethyl acetate, ethers, such as tetrahydrofuran, and nitriles, for example acetonitrile. The catalyst concentration is preferably at least 0.01 mmol to 100 moles of monomer. The catalyst can be introduced as the pure substance or as a solution or suspension, for example in THF, toluene or acetonitrile.

The polymerization can be carried out both continuously and batchwise.

For the polymerization, the following procedures, for example, are suitable:
(a) initial introduction of solid, suspended or dissolved catalyst (or its components), and simultaneous or successive addition of the monomer or monomers at the desired temperature
(b) initial introduction of the monomer or monomers, and injection of the catalyst solution or suspension (or its components) at the desired temperature
(c) continuous metered addition of the catalyst solution (or its components) and the monomer or monomers under prespecified desired polymerization conditions (pressure and temperature).

The polymerization temperature is preferably +40° to +120° C.

The polymers prepared according to the invention preferably have a molecular weight Mn of >10 kg/mol.

The molecular weight distribution of the polymers can be varied within a broad range, and it is possible, for example, to prepare polymers having a polydispersity Mw/Mn between 1 and 2, Mw and Mn being defined as follows:
Mw: weight average of molecular weight
Mn: number average of molecular weight By selection of suitable acrylic compounds, the process according to the invention furthermore permits the physical properties, such as, for example, glass transition temperature and hardness, to be influenced in a wide range.

In the following examples, the following data are given for characterization: intrinsic viscosity, molecular weight and molecular weight distribution using gel-permeation chromatography (GPC). The following abbreviations are used for designating the substances:

Ph: phenyl, $Pr^i$: iso-propyl, Me: methyl, PMMA: polymethyl methacrylate, MMA: methyl methacrylate, Et: ethyl.

EXAMPLE 1

The temperature of 1,001 g (10 mol) of dry methyl methacrylate (MMA), freshly distilled under $N_2$, in a 2 liter three-neck flask with air and moisture exclusion is kept at 60°. 250 mg (1 mmol) of triisopropyl phosphine benzylidene ($Pr_3iPCHPh$) in 10 ml of toluene were injected. The mixture was stirred at 60° C. for 1 hour and the polymerization subsequently terminated using methanol. After precipitation in methanol, washing and drying, 78 g of solid white polymethyl methacrylate (PMMA) were obtained. Intrinsic viscosity in methylene chloride at 25° C. 1.7 dl/g
GPC: Mn=214 kg/mol, Mw/Mn=4.7.

EXAMPLE 2

Corresponding to Example 1, but
catalyst: 276 mg (1 mmol) of $Ph_3PCH_2$ in 20 ml of toluene
polymerization temperature: 100° C.
polymerization time: 2 hours
yield of polymer: 85 g of PMMA intrinsic viscosity in methylene chloride at 25° C.=6.1 dl/g
GPC: Mn=1,129 kg/mol, Mw/Mn=2.5.

EXAMPLE 3

Corresponding to Example 1, but
catalyst: 349 mg (1 mmol) of $Ph_3PNSiMe_3$ in 20 ml of toluene
polymerization temperature: 100° C.
polymerization time: 2 hours
yield of polymer: 66 g
intrinsic viscosity in methylene chloride at 25° C.=6.0 dl/g
GPC: Mn=1,076 kg/mol, Mw/Mn=2.7.

EXAMPLE 4

Corresponding to Example 1, but
catalyst: 326 mg (1 mmol) of $Ph_3PC(CN)_2$ in 20 ml of toluene
polymerization temperature: 100° C.
polymerization time: 2 hours
yield of polymer: 116 g
intrinsic viscosity in methylene chloride at 25° C.=4.8 dl/g
GPC: Mn=678 kg/mol, Mw/Mn=3.3.

EXAMPLE 5

Corresponding to Example 1, but
catalyst in 20 ml of toluene
polymerization temperature: 100° C.
polymerization time: 2 hours
yield of polymer: 267 g of PMMA
intrinsic viscosity in methylene chloride at 25° C.=3.8 dl/g
GPC: Mn=271 kg/mol, Mw/Mn=6.9.

EXAMPLE 6

10 mmol of boron trifluoride etherate $BF_3.O(C_2H_5)_2$ were added to a solution of 3.80 g (10 mmol) of $Ph_3PCHCPhO$ in 100 ml of toluene. A precipitate formed immediately. After 10 minutes, the supernatant liquid was decanted off from this, and the precipitate was washed with ether and dried in vacuo. 522 mg of the white powder were employed for the subsequent polymerization, the catalyst, as a solid, being stirred into 1,001 g of boiling methyl methacrylate. After polymerizing for one hour at 100° C., 10 ml of methanol were added to the flask contents, which had in the meantime become viscous, and the PMMA formed was then precipitated in 3 liters of methanol, washed and dried.
Yield of polymer 65 g of PMMA.

EXAMPLE 7 (Preparation of the initiator $Ph_3PCH_2.Me_3SiCl$)

2.76 g (10 mmol) of $Ph_3PCH_2$ and 1.08 g (10 mmol) of $Me_3SiCl$ in 200 ml of toluene were reacted at 20° C. with exclusion of air and moisture. The silylation product of the ylide immediately precipitated as white crystals and was isolated by Schlenk filtration after stirring for 10 minutes, washed and dried in a high vacuum.

EXAMPLE 8

276 mg (1 mmol) of $Ph_3PCH_2$ and 108 mg (1 mmol) of $Me_3SiCl$ in 20 ml of dry, $N_2$-saturated toluene were reacted at 20° C. for 10 minutes with exclusion of air and moisture. The resultant suspension was injected into 1,001 g (10 mol) of MMA, which had been heated to 100° C. After 2 hours, the polymerization was terminated using methanol and the polymer was precipitated in methanol. After washing with methanol and drying in vacuo, 63 g of solid PMMA were weighed out.
Intrinsic viscosity in methylene chloride at 25° C. 3.4 dl/g
GPC: Mn=641 kg/mol, Mw/Mn=2.7.

EXAMPLE 9

10 g (32 mmol) of $Ph_3PCHCHO$ were dissolved in 200 ml of chloroform, and an excess of trimethylchlorosilane was added, the mixture was heated to boiling, and the silyl complex $Ph_3PCHCHO.Me_3SiCl$ was precipitated with ether after 3 hours, washed and dried in vacuo.

EXAMPLE 10

A suspension of 2.06 g (5 mmol) of $Ph_3PCHCHO.Me_3SiCl$ (see Example 9) in 25 ml of acetonitrile and 25 ml of THF were pipetted into 50 g (0.5 mol) of dry methyl methacrylate (MMA), freshly distilled under $N_2$, at 20° C. under a protective gas. After heating to about 80° C., the mixture was allowed to react for about 2 hours. The PMMA formed was precipitated in 1 liter of methanol, washed and dried in vacuo. Yield of polymer: 5.9 g.
Intrinsic viscosity in methylene chloride at 25° C.=0.7 dl/g
GPC: main material (about 90%) Mn=140 kg/mol, Mw/Mn=1.5

EXAMPLE 11

278 mg (1 mmol) of $Ph_3PO$ were reacted with 199 mg (1 mmol) of $Me_3SnCl$ in 20 ml of dry, $N_2$-saturated toluene at 20° C. for 10 minutes with stirring and exclusion of air and moisture, and subsequently injected into 1001 g of freshly distilled, dry methyl methacrylate which had been heated to 100°. After 2 hours, the PMMA formed was worked up as described above.
Yield of polymer: 207 g
Intrinsic viscosity in methylene chloride at 25° C.=5.8 dl/g
GPC: Mn=929 kg/mol, Mw/Mn=2.8

EXAMPLE 12

10.95 g (55 mmol) of $Me_3SnCl$ in 50 ml of chloroform were added dropwise to 16.7 g (50 mmol) of $Ph_3PCHOOMe$ in 100 ml of chloroform, and the mixture was stirred for 30 minutes at 20° C. and for 3 hours at 60° C. The mixture was subsequently concentrated, ether was added, and the product was isolated by Schlenk filtration, washed and dried in vacuo.

EXAMPLE 13

2.13 g (4 mmol) of $Ph_3PCHCOOMe.Me_3SnCl$ were stirred for 10 minutes at 20° C. with 0.78 g (0.8 mmol) of $AgBF_4$ in 20 ml of acetonitrile and 20 ml of THF. The mixture was subsequently filtered through a reverse frit, and the filtrate was injected into 40 g (0.4 mol) of hot MMA at 80°. Work-up was effected after 2 hours.
Yield of polymer: 18.7 g
Intrinsic viscosity in methylene chloride at 25° C. 0.6 dl/g
GPC: Mn=76 kg/mol, Mw/Mn=1.7

EXAMPLE 14

0.58 g (1 mmol) of $Ph_3PCHCPhO.Me_3SnCl$ were stirred for 10 minutes at 25° C. with 0.015 g (0.2 mmol) of $KHF_2$ in a mixture of 5 ml of THF and 5 ml of acetonitrile under a protective gas. This preformed catalyst was injected into a 40 liter autoclave which contained 9,811 g (98 mol) of ethyl acrylate and 284 g (2 mol) of glycidyl methacrylate and 10,095 g of toluene. The mixture was heated to 100° with stirring. After 5 hours, the conversion was about 90%. The polymerization was terminated after 10 hours, and the product was precipitated using n-hexane and dried in vacuo.

Intrinsic viscosity in methylene chloride at 25° C.=0.9 dl/g

GPC: Monomodale distribution Mn=57 kg/mol, Mw/Mn=3.2

The polymer contains 3.05% by weight of glycidyl methacrylate.

We claim:

1. Process for thermal polymerization of acrylic derivatives in the presence of a catalyst, characterized in that the catalyst corresponds to or contains the following structure

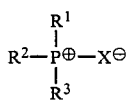

(I)

in which $R^1$, $R^2$ and $R^3$, independently of one another, denote conventional substituents for organophosphorus compounds, where $R^2$ can have the meaning

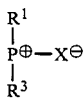

X denotes O, N—$R^4$,

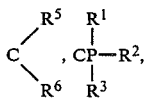

CCO and CCS, $R^4$, $R^5$ and $R^6$, independently of one another, denote hydrogen, an alkali metal, sulphonate, silyl, stannyl, phosphino or boranyl radicals, acyl, halogen, cyano, a —CO—$R^7$ radical or a radical mentioned under $R^1$, $R^7$ denotes hydrogen or a radical mentioned under $R^1$, where at least two of the radicals $R^1$ to $R^7$, together, can be part of a ring, the use of ketenesilyl acetals which are obtained by addition of silyl phosphites to $\alpha,\beta$-unsaturated esters being excluded and the process furthermore being characterized in that the polymerization is carried out above −20° C.

2. Process according to claim 1, characterized in that $R^1$ to $R^3$ denote optionally substituted straight-chain or branched $C_1$–$C_{20}$-alkyl radicals, $C_6$–$C_{12}$-aryl radicals, $C_2$–$C_{30}$-alkenyl radicals, $C_3$–$C_8$-cycloalkyl radicals, $C_6$–$C_{12}$-aryl-$C_1$–$C_{20}$-alkyl radicals, $C_1$–$C_{20}$-alkyl-$C_6$–$C_{12}$-aryl radicals, halogen, hydroxyl, $C_1$–$C_{20}$-alkoxy radicals, $C_6$–$C_{12}$-aryloxy radicals, $C_1$–$C_{20}$-alkylamino, $C_6$–$C_{12}$-arylamino, $C_1$–$C_{20}$-alkylphosphino or $C_6$14 $C_{12}$-arylphosphino radicals.

3. Process according to any one of the previous claims, characterized in that at least one of the radicals $R^1$ to $R^3$ is substituted by cyano, sulphonate, silyl, stannyl, halogen, hydroxyl, amino, $C_1$–$C_{20}$-alkylamino, $C_6$–$C_{12}$-arylamino, nitro, $C_1$–$C_{20}$-alkylphosphino, $C_6$–$C_{12}$-arylphosphino, $C_1$–$C_{20}$-alkoxy, $C_6$–$C_{12}$-aryloxy, an alkali metal atom or a —CO—$R^7$ radical.

4. Process according to claim 1, characterized in that $R^1$ to $R^3$ denote phenyl or isopropyl.

5. Process according to claim 1, characterized in that X denotes: $CH_2$, CH-vinyl, CH-propenyl, CH-styryl, CH-phenyl, CH-formyl, CH-acetyl, CH-benzoyl, CH-carbomethoxy, $C(acetyl)_2$, $C(benzoyl)_2$, N-silyl or $C(CN)_2$.

6. Process according to claim 1, characterized in that the catalyst used is a complex of the following formula (II)

$$(R^1R^2R^3PX)_nML_m \qquad (II)$$

in which $R^1$, $R^2$, $R^3$ and X have the meaning mentioned in claim 1, and in which n denotes 1 to 4

M denotes a main-group element of main group 1 to 4,

L denotes a ligand, and m denotes 1–3.

7. Process according to claim 6, characterized in that M denotes an element of main group 3 or 4.

8. Process according to claim 1, characterized in that at least one the P-substituents of the formula I is a siloxy-substituted alkenyl radical.

9. Process according to claim 1, characterized in that the catalyst used is a product of the protonation of the compound of the formula (I).

10. Process according to claim 1, characterized in that the acrylic acid derivative used is an ester.

11. Process according to claim 1, characterized in that various acrylic derivatives are copolymerized.

12. Process according to claim 1, characterized in that polymerization is carried out in the presence of a nucleophile.

* * * * *

UNITED STATES PATENT AND TRADEMARK OFFICE
CERTIFICATE OF CORRECTION

PATENT NO. : 4,849,488

DATED : July 18, 1989

INVENTOR(S) : Starzewski et al.

It is certified that error appears in the above-identified patent and that said Letters Patent is hereby corrected as shown below:

Title Page U.S. PATENT DOCUMENTS: After "4,717,783, 1/1988" delete "Dabas" and substitute --Dubois--

Col. 3, line 10    Delete "($Ph_3PCHMeO.SiMe_3)+Cl-$" and substitute-- ($Ph_3PCHCMeO.SiMe_3)+Cl-$ --

Col. 3, line 15    Delete "production" and substitute --protonation--

Col. 8, line 11    Delete "$C_614\ C_{12}$-" and substitute --$C_6-C_{12}$- --

Signed and Sealed this

Seventh Day of August, 1990

Attest:

HARRY F. MANBECK, JR.

*Attesting Officer*    *Commissioner of Patents and Trademarks*